United States Patent
Tanaka (10) Patent No.: US 8,896,781 B2
(45) Date of Patent: Nov. 25, 2014

(54) DISPLAY DEVICE AND DISPLAY MODULE

(75) Inventor: Kazuya Tanaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 90 days.

(21) Appl. No.: 13/420,042

(22) Filed: Mar. 14, 2012

(65) Prior Publication Data

US 2012/0249917 A1     Oct. 4, 2012

(30) Foreign Application Priority Data

Mar. 28, 2011   (JP) .................................. 2011-69792

(51) Int. Cl.
| | | |
|---|---|---|
| G02F 1/1333 | (2006.01) | |
| H04N 5/64 | (2006.01) | |
| G06F 1/16 | (2006.01) | |
| H05K 5/00 | (2006.01) | |
| G02F 1/1335 | (2006.01) | |

(52) U.S. Cl.
CPC .... G02F 1/133308 (2013.01); *G02F 1/133615* (2013.01); *G02F 2001/133322* (2013.01); *G02F 2001/133317* (2013.01)
USPC ............. 349/58; 348/787; 348/789; 348/836; 361/679.02; 361/679.21; 361/724

(58) Field of Classification Search
None
See application file for complete search history.

(56) References Cited

U.S. PATENT DOCUMENTS

| | | | |
|---|---|---|---|
| 7,576,811 B2 | 8/2009 | Kazushige | |
| 7,679,694 B2 * | 3/2010 | Shirai | ............................. 349/58 |
| 7,764,335 B2 | 7/2010 | Tanaka et al. | |
| 2003/0043310 A1 * | 3/2003 | Cho | ................................ 349/58 |
| 2005/0105011 A1 | 5/2005 | An | |
| 2009/0079902 A1 | 3/2009 | Ogura | |
| 2010/0134715 A1 * | 6/2010 | Shirai | ............................. 349/58 |

FOREIGN PATENT DOCUMENTS

| | | |
|---|---|---|
| EP | 0 982 622 A2 | 3/2000 |
| EP | 2 172 802 A1 | 4/2010 |
| JP | 2007-10818 A | 1/2007 |
| JP | 2007-280770 A | 10/2007 |
| JP | 2008-122822 A | 5/2008 |
| JP | 2009-80229 A | 4/2009 |
| JP | 2009-92721 A | 4/2009 |
| JP | 2010-230962 A | 10/2010 |

OTHER PUBLICATIONS

Extended European Search Report dated Nov. 9, 2012 (seven (7) pages).

* cited by examiner

*Primary Examiner* — Bumsuk Won
*Assistant Examiner* — Angela Davison
(74) *Attorney, Agent, or Firm* — Crowell & Moring LLP (57) ABSTRACT

This display device includes a display portion, a first frame including an engaging protrusion portion, and a second frame including an engaging hole, while the engaging protrusion portion of the first frame includes a first engaging portion engaging with the engaging hole to regulate movement of the first frame in a second direction separating from the second frame and a second engaging portion engaging with the engaging hole to regulate movement of the first frame in a fourth direction opposite to a first direction with respect to the second frame.

14 Claims, 6 Drawing Sheets

DISPLAY DEVICE AND DISPLAY MODULE

BACKGROUND OF THE INVENTION

1. Field of the Invention

The present invention relates to a display device and a display module, and more particularly, it relates to a display device and a display module each including a frame having an engaging protrusion portion and a frame having an engaging hole engaging with the engaging protrusion portion.

2. Description of the Background Art

A display device including a frame having an engaging protrusion portion and a frame having an engaging hole engaging with the engaging protrusion portion is known in general, as disclosed in Japanese Patent Laying-Open No. 2008-122822, for example.

The aforementioned Japanese Patent Laying-Open No. 2008-122822 discloses an electro-optic device mounting case (display device) including a frame-shaped cover (frame) having an engaging protrusion portion, a plate-like plate (frame) having an engaging hole, and a liquid crystal device arranged to be held between the cover and the plate. The engaging protrusion portion of the cover is formed to protrude outward (laterally) from the side surface of the cover. The outer edge of the plate is formed with a wall portion, and the engaging hole is formed in the wall portion. The engaging protrusion portion of the cover engages with the engaging hole of the plate to mount the cover on the plate. The engaging hole regulates upward movement of the engaging protrusion portion of the cover to regulate movement of the cover in a direction (upward direction) separating from the plate.

In the electro-optic device mounting case according to the aforementioned Japanese Patent Laying-Open No. 2008-122822, however, the engaging protrusion portion of the cover disengages from the engaging hole of the plate when the cover moves in a direction opposite to the protruding direction of the engaging protrusion portion although the movement of the cover in the upward direction (direction separating) from the plate can be regulated in a state where the engaging protrusion portion of the cover engages with the engaging hole of the plate. Thus, the engaging protrusion portion of the cover disadvantageously disengages from the engaging hole of the plate. Consequently, it is difficult to maintain the engaging state between the cover (frame) formed with the engaging protrusion portion and the plate (frame) formed with the engaging hole when the cover formed with the engaging protrusion portion moves in the direction opposite to the protruding direction of the engaging protrusion portion.

SUMMARY OF THE INVENTION

The present invention has been proposed in order to solve the aforementioned problem, and an object of the present invention is to provide a display device and a display module each capable of maintaining an engaging state between a frame formed with an engaging protrusion portion and a frame formed with an engaging hole when the frame formed with the engaging protrusion portion moves in a direction opposite to the protruding direction of the engaging protrusion portion.

A display device according to a first aspect of the present invention includes a display portion, a first frame including an engaging protrusion portion protruding in a first direction outward from an outer edge of the first frame, arranged to overlap with the display portion, and a second frame including an engaging hole engaging with the engaging protrusion portion of the first frame, while the engaging protrusion portion of the first frame includes a first engaging portion protruding in the first direction outward from the outer edge of the first frame and engaging with the engaging hole to regulate movement of the first frame in a second direction separating from the second frame and a second engaging portion protruding in a third direction in which the first frame is mounted to the second frame and engaging with the engaging hole to regulate movement of the first frame in a fourth direction opposite to the first direction with respect to the second frame.

In the display device according to the first aspect, as hereinabove described, the engaging protrusion portion of the first frame includes the second engaging portion engaging with the engaging hole to regulate the movement of the first frame in the fourth direction opposite to the first direction with respect to the second frame. Thus, the second engaging portion can inhibit the engaging protrusion portion and the engaging hole from disengaging from each other when the first frame formed with the engaging protrusion portion moves in the fourth direction (direction toward the inside of the second frame) opposite to the first direction (direction outward from the outer edge) in which the engaging protrusion portion protrudes with respect to the second frame formed with the engaging hole. Consequently, the engaging state between the first frame formed with the engaging protrusion portion and the second frame formed with the engaging hole can be maintained. Furthermore, the engaging protrusion portion of the first frame includes the first engaging portion protruding in the first direction outward from the outer edge of the first frame and engaging with the engaging hole to regulate the movement of the first frame in the second direction separating from the second frame, whereby the first engaging portion can inhibit the engaging protrusion portion and the engaging hole from disengaging from each other when the first frame formed with the engaging protrusion portion moves in the second direction separating from the second frame formed with the engaging hole. Consequently, the engaging state between the first frame formed with the engaging protrusion portion and the second frame formed with the engaging hole can be maintained. Thus, the two engaging portions, i.e., the second engaging portion and the first engaging portion of the engaging protrusion portion of the first frame can regulate the movement of the first frame in the two directions, i.e., the fourth direction and the second direction with respect to the second frame, and hence the engaging state between the first frame formed with the engaging protrusion portion and the second frame formed with the engaging hole can be reliably maintained.

In the aforementioned display device according to the first aspect, the engaging protrusion portion of the first frame preferably further includes a third engaging portion protruding in the fourth direction opposite to the first direction and engaging with the engaging hole to regulate movement of the first frame in the third direction with respect to the second frame. According to this structure, the third engaging portion of the engaging protrusion portion of the first frame can regulate the movement of the first frame in the three directions including not only the fourth direction and the second direction but also the third direction with respect to the second frame, and hence the engaging state between the first frame and the second frame can be more reliably maintained.

In this case, a width of the third engaging portion in the fourth direction is preferably larger than a thickness of a bottom portion of the second frame in a vicinity of the engaging hole. According to this structure, the movement of the first frame in the third direction with respect to the second frame can be more reliably regulated as compared with a case where the width of the third engaging portion in the fourth direction is smaller than the thickness of the bottom portion of the second frame in the vicinity of the engaging hole.

In the aforementioned display device having the engaging protrusion portion further including the third engaging portion, the third engaging portion of the engaging protrusion portion of the first frame is preferably formed to engage with an inner bottom surface of the second frame in a vicinity of the engaging hole so as to regulate the movement of the first frame in the third direction. According to this structure, the engaging protrusion portion of the first frame can be inhibited from disengaging in the third direction from the engaging hole of the second frame, and hence the engaging state between the first frame formed with the engaging protrusion portion and the second frame formed with the engaging hole can be maintained.

In the aforementioned display device according to the first aspect, the second engaging portion of the engaging protrusion portion of the first frame and an inner surface of the engaging hole of the second frame in the fourth direction are preferably opposed to each other at a prescribed interval. According to this structure, the second engaging portion of the engaging protrusion portion of the first frame and the inner surface of the engaging hole of the second frame in the fourth direction are arranged at the prescribed interval so that the first frame and the second frame can be inhibited from contact with each other and deformation due to thermal stress even when the first frame or the second frame thermally expands by heat or the like generated by using the display device, for example.

In the aforementioned display device according to the first aspect, the engaging hole of the second frame is preferably formed over a side surface and a bottom surface of the second frame. According to this structure, a portion of the engaging hole in the side surface can regulate movement of the first frame in one direction while a portion of the engaging hole in the bottom surface can regulate movement of the first frame in another direction dissimilarly to a case where the engaging hole of the second frame is formed in either the side surface or the bottom surface of the second frame. Consequently, the movement of the first frame in the two directions with respect to the second frame can be easily regulated.

In this case, the second engaging portion of the engaging protrusion portion of the first frame is preferably formed to engage with an inner surface of the engaging hole formed in the bottom surface of the second frame in the fourth direction so as to regulate the movement of the first frame in the fourth direction with respect to the second frame. According to this structure, the engaging protrusion portion of the first frame can be inhibited from disengaging in the fourth direction from the engaging hole of the second frame, and hence the engaging state between the first frame formed with the engaging protrusion portion and the second frame formed with the engaging hole can be maintained.

In the aforementioned display device having the engaging hole formed over the side surface and the bottom surface of the second frame, the first engaging portion of the engaging protrusion portion of the first frame is preferably formed to engage with an inner surface of the engaging hole formed in the side surface of the second frame in the second direction so as to regulate the movement of the first frame in the second direction with respect to the second frame. According to this structure, the engaging protrusion portion of the first frame can be inhibited from disengaging in the second direction from the engaging hole of the second frame, and hence the engaging state between the first frame formed with the engag-ing protrusion portion and the second frame formed with the engaging hole can be maintained.

In the aforementioned display device according to the first aspect, the engaging protrusion portion of the first frame preferably further includes a fourth engaging portion engaging with the engaging hole to regulate movement of the first frame in a fifth direction substantially orthogonal to the first direction, the second direction, the third direction, and the fourth direction with respect to the second frame. According to this structure, the engaging protrusion portion of the first frame can be inhibited from disengaging in the fifth direction from the engaging hole of the second frame, and hence the engaging state between the first frame formed with the engaging protrusion portion and the second frame formed with the engaging hole in the fifth direction can be maintained.

In this case, the engaging hole of the second frame is preferably formed over a side surface and a bottom surface of the second frame, and the fourth engaging portion of the engaging protrusion portion of the first frame is preferably formed to engage with an inner surface of the engaging hole of the second frame in the fifth direction so as to regulate the movement of the first frame in the fifth direction with respect to the second frame. According to this structure, the engaging protrusion portion of the first frame can be inhibited from disengaging in the fifth direction from the engaging hole of the second frame, and hence the engaging state between the first frame formed with the engaging protrusion portion and the second frame formed with the engaging hole in the fifth direction can be maintained.

In the aforementioned display device having the engaging protrusion portion including the fourth engaging portion, both of the first engaging portion and the second engaging portion of the engaging protrusion portion preferably engage with the engaging hole along the fifth direction. According to this structure, the first engaging portion engaging with the engaging hole along the fifth direction can inhibit the engaging protrusion portion from disengaging in the second direction from the engaging hole while the second engaging portion engaging with the engaging hole along the fifth direction can inhibit the engaging protrusion portion from disengaging in the fourth direction from the engaging hole. Thus, the engaging state between the first frame and the second frame can be more reliably maintained.

In the aforementioned display device according to the first aspect, an inner surface of the second frame is preferably formed to regulate movement of an outer surface of the first frame in the first direction with respect to the second frame in a state where the engaging protrusion portion of the first frame and the engaging hole of the second frame engage with each other. According to this structure, the inner surface of the second frame can inhibit the first frame from disengaging in the first direction from the second frame, and hence the engaging state between the first frame and the second frame in the first direction can be maintained.

In the aforementioned display device according to the first aspect, the engaging protrusion portion of the first frame preferably further includes an inclined portion inclined to be tapered toward the third direction in which the first frame is mounted to the second frame. According to this structure, the engaging protrusion portion can be easily inserted into the engaging hole when the first frame is mounted to the second frame in the third direction, and hence the engaging protrusion portion can easily engage with the engaging hole.

In the aforementioned display device according to the first aspect, each of the first frame and the second frame is preferably formed in a substantially rectangular shape in plan view, and the engaging protrusion portion of the first frame is preferably provided on each of two sides opposed to each other in outer edges of the first frame while the engaging hole of the second frame is preferably provided in each of two sides opposed to each other in side surfaces of the second frame. According to this structure, the engaging protrusion portion and the engaging hole can engage with each other on each of the two sides opposed to each other, and hence the engaging state between the first frame and the second frame can be reliably maintained.

In the aforementioned display device according to the first aspect, the display portion preferably includes a liquid crystal display portion, and a light guide plate and a light reflective sheet are preferably arranged between the first frame and the second frame. Thus, the light guide plate and the light reflective sheet are arranged between the first frame and the second frame in a state where the engaging state between the first frame and the second frame is reliably maintained, and hence the display device in which the light guide plate and the light reflective sheet properly overlaps the liquid crystal display portion can be obtained.

A display module according to a second aspect of the present invention includes a display portion, a first frame including an engaging protrusion portion protruding in a first direction outward from an outer edge of the first frame, arranged to overlap with the display portion, and a second frame including an engaging hole engaging with the engaging protrusion portion of the first frame, while the engaging protrusion portion of the first frame includes a first engaging portion protruding in the first direction outward from the outer edge of the first frame and engaging with the engaging hole to regulate movement of the first frame in a second direction separating from the second frame and a second engaging portion protruding in a third direction in which the first frame is mounted to the second frame and engaging with the engaging hole to regulate movement of the first frame in a fourth direction opposite to the first direction with respect to the second frame.

In the display module according to the second aspect, as hereinabove described, the engaging protrusion portion of the first frame includes the second engaging portion engaging with the engaging hole to regulate the movement of the first frame in the fourth direction opposite to the first direction with respect to the second frame. Thus, the second engaging portion can inhibit the engaging protrusion portion and the engaging hole from disengaging from each other when the first frame formed with the engaging protrusion portion moves in the fourth direction (direction toward the inside of the second frame) opposite to the first direction (direction outward from the outer edge) in which the engaging protrusion portion protrudes with respect to the second frame formed with the engaging hole. Consequently, the engaging state between the first frame formed with the engaging protrusion portion and the second frame formed with the engaging hole can be maintained. Furthermore, the engaging protrusion portion of the first frame includes the first engaging portion protruding in the first direction outward from the outer edge of the first frame and engaging with the engaging hole to regulate the movement of the first frame in the second direction separating from the second frame, whereby the first engaging portion can inhibit the engaging protrusion portion and the engaging hole from disengaging from each other when the first frame formed with the engaging protrusion portion moves in the second direction separating from the second frame formed with the engaging hole. Consequently, the engaging state between the first frame formed with the engaging protrusion portion and the second frame formed with the engaging hole can be maintained. Thus, the two engaging portions, i.e., the second engaging portion and the first engaging portion of the engaging protrusion portion of the first frame can regulate the movement of the first frame in the two directions, i.e., the fourth direction and the second direction with respect to the second frame, and hence the engaging state between the first frame formed with the engaging protrusion portion and the second frame formed with the engaging hole can be reliably maintained.

In the aforementioned display module according to the second aspect, the engaging protrusion portion of the first frame preferably further includes a third engaging portion protruding in the fourth direction opposite to the first direction and engaging with the engaging hole to regulate movement of the first frame in the third direction with respect to the second frame. According to this structure, the third engaging portion of the engaging protrusion portion of the first frame can regulate the movement of the first frame in the three directions including not only the fourth direction and the second direction but also the third direction with respect to the second frame, and hence the engaging state between the first frame and the second frame can be more reliably maintained.

In this case, a width of the third engaging portion in the fourth direction is preferably larger than a thickness of a bottom portion of the second frame in a vicinity of the engaging hole. According to this structure, the movement of the first frame in the third direction with respect to the second frame can be more reliably regulated as compared with a case where the width of the third engaging portion in the fourth direction is smaller than the thickness of the bottom portion of the second frame in the vicinity of the engaging hole.

In the aforementioned display module having the engaging protrusion portion further including the third engaging portion, the third engaging portion of the engaging protrusion portion of the first frame is preferably formed to engage with an inner bottom surface of the second frame in a vicinity of the engaging hole so as to regulate the movement of the first frame in the third direction. According to this structure, the engaging protrusion portion of the first frame can be inhibited from disengaging in the third direction from the engaging hole of the second frame, and hence the engaging state between the first frame formed with the engaging protrusion portion and the second frame formed with the engaging hole can be maintained.

In the aforementioned display module according to the second aspect, the second engaging portion of the engaging protrusion portion of the first frame and an inner surface of the engaging hole of the second frame in the fourth direction are preferably opposed to each other at a prescribed interval. According to this structure, the second engaging portion of the engaging protrusion portion of the first frame and the inner surface of the engaging hole of the second frame in the fourth direction are arranged at the prescribed interval so that the first frame and the second frame can be inhibited from contact with each other and deformation due to thermal stress even when the first frame or the second frame thermally expands by heat or the like generated by using the display module, for example.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a liquid crystal television set 100 according to the embodiment of the present invention is described with reference to FIGS. 1 to 6. The liquid crystal television set 100 is an example of the "display device" in the present invention.

Figure 1:
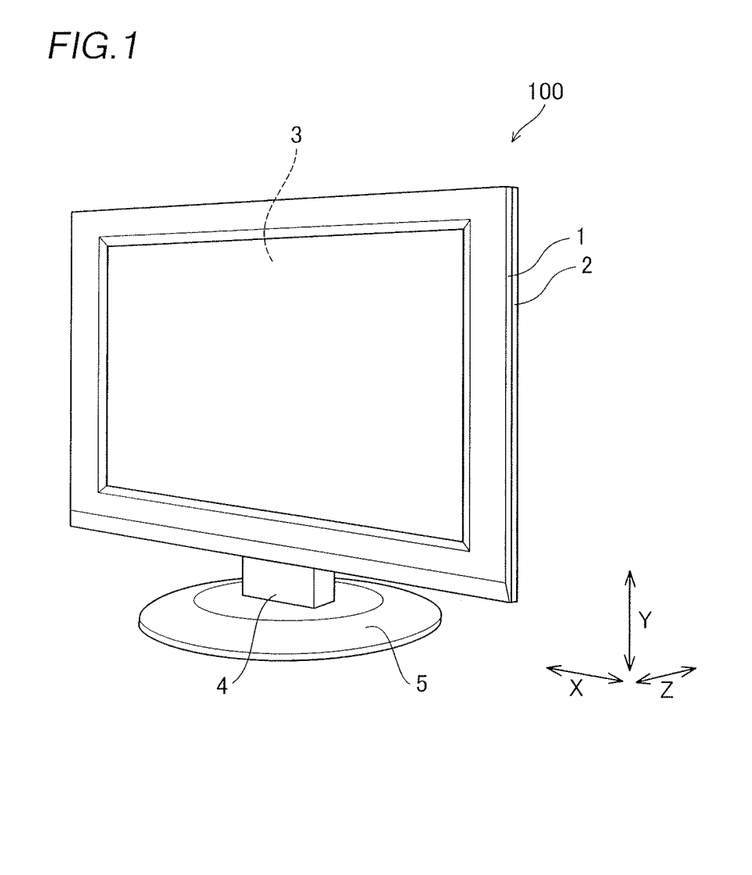
FIG. 1 is an overall view of a liquid crystal television set according to an embodiment of the present invention.

The liquid crystal television set 100 according to the embodiment of the present invention includes a front housing 1, a rear housing 2, a liquid crystal module 3 arranged between the front housing 1 and the rear housing 2, a support member 4 supporting the overall liquid crystal television set 100, and a base member 5 arranged below the support member 4, as shown in FIG. 1. The liquid crystal module 3 is an example of the "display module" in the present invention.

Figure 2:
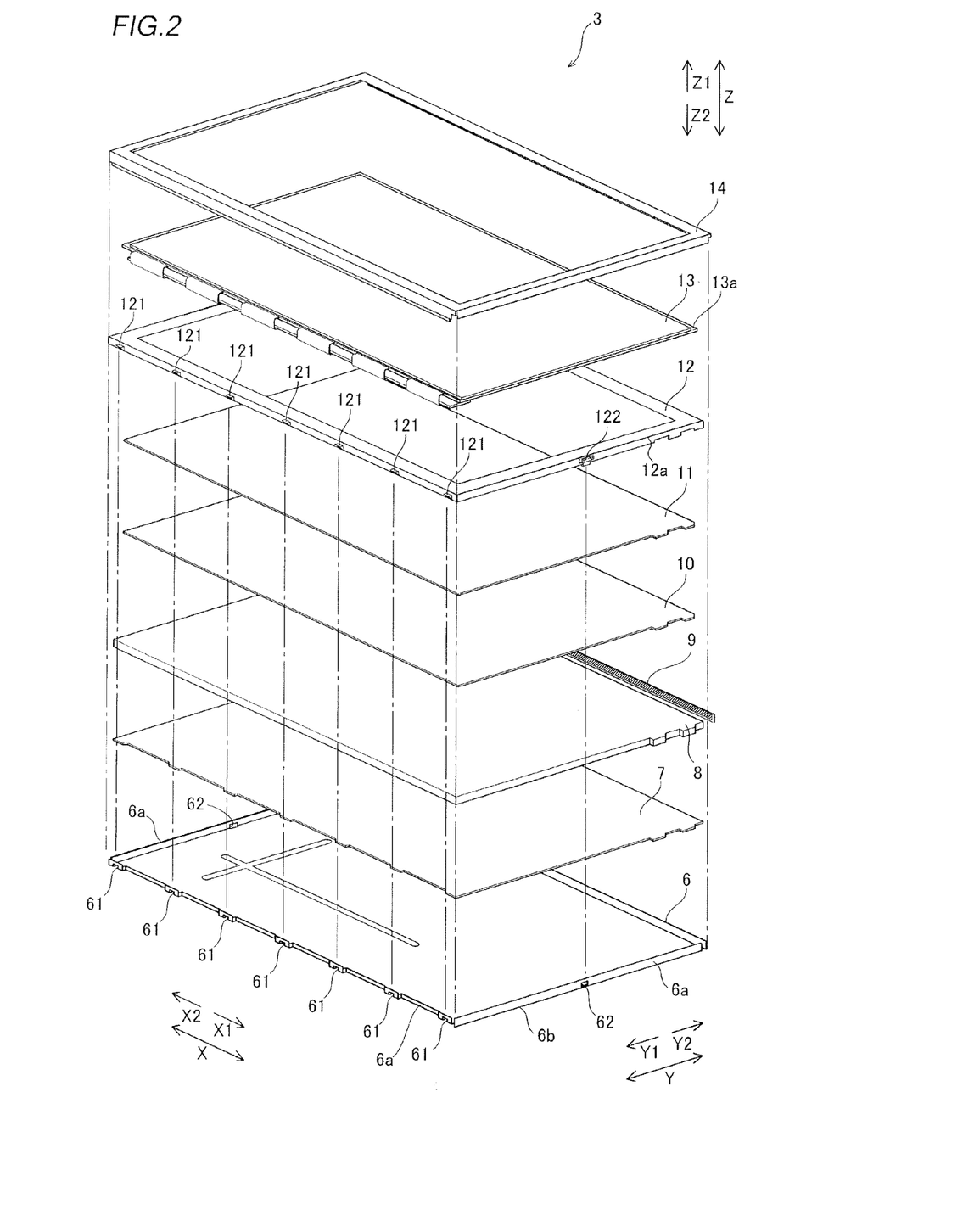
FIG. 2 is an exploded perspective view of a liquid crystal module according to the embodiment of the present invention.
Figure 3:
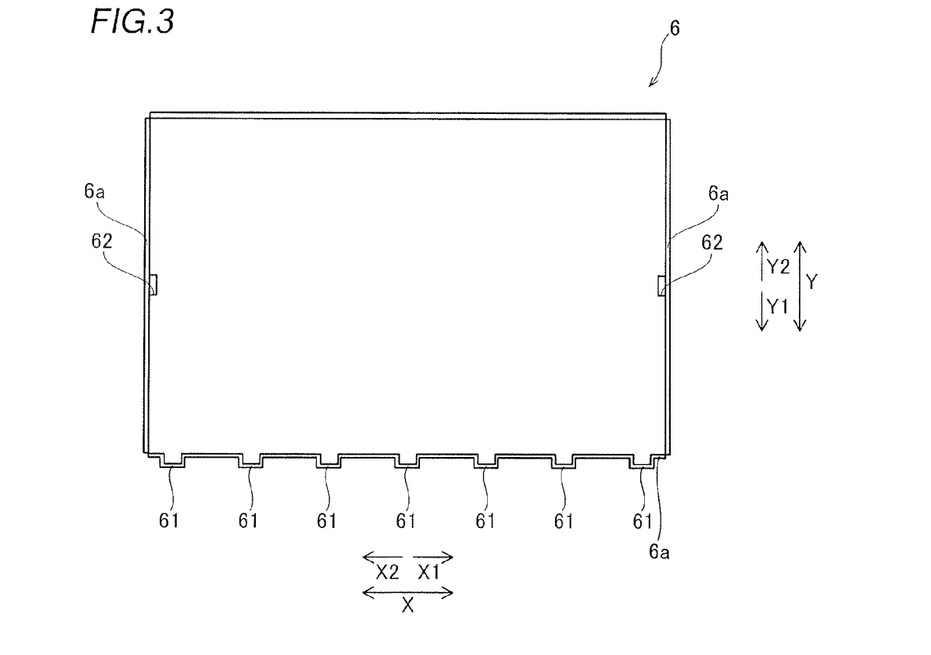
FIG. 3 is a plan view of a rear frame according to the embodiment of the present invention.
Figure 5:
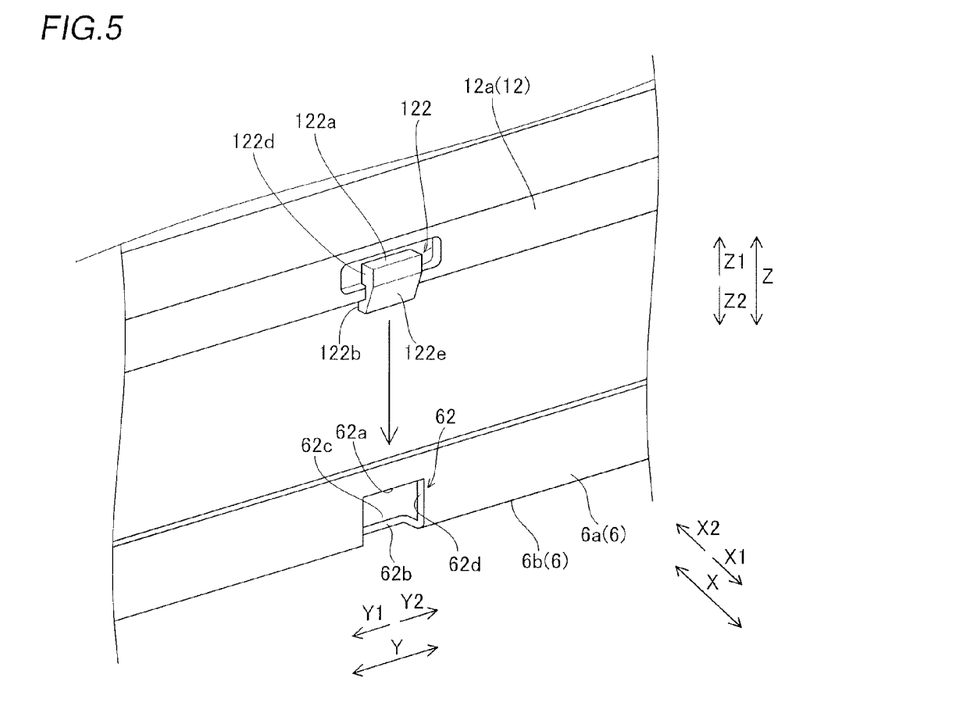
FIG. 5 is a diagram of an engaging protrusion portion of the resin frame and an engaging hole of the rear frame according to the embodiment of the present invention prior to engagement.

As shown in FIG. 2, the liquid crystal module 3 includes a rear frame 6 made of sheet metal, having a substantially rectangular shape elongated in a direction X as viewed from the bottom surface (as viewed in a direction Z1). The rear frame 6 is an example of the "second frame" in the present invention. As shown in FIG. 3, the side surface 6a of the rear frame 6 in a direction Y1 is formed with seven engaging portions 61 each having a hole. The side surface 6a of the rear frame 6 in a direction X1 and the side surface 6a of the rear frame 6 in a direction X2 each are formed with a single engaging hole 62. As shown in FIG. 5, the engaging hole 62 of the rear frame 6 is formed over two surfaces, i.e., the side surface 6a and the bottom surface 6b of the rear frame 6 (the side surface 6a in the direction X1 and the bottom surface 6b in a direction Z2). The engaging hole 62 has a substantially rectangular shape as viewed from the front side (as viewed in the direction X2) and the bottom surface.

As shown in FIG. 2, a light reflective sheet 7 is arranged above (in the direction Z1 of) the rear frame 6. A light guide plate 8 is arranged above the light reflective sheet 7. A light source 9 including an LED or the like is arranged lateral to (in a direction Y2 of) the light guide plate 8. A light diffusion sheet 10 is arranged above the light guide plate 8. A prism sheet 11 is arranged above the light diffusion sheet 10. The light reflective sheet 7, the light guide plate 8, the light diffusion sheet 10, and the prism sheet 11 each have a substantially rectangular shape elongated in the direction X as viewed from the bottom surface.

Furthermore, a frame-shaped resin frame 12 having a substantially rectangular shape elongated in the direction X as viewed from the bottom surface is arranged above the prism sheet 11. The resin frame 12 is an example of the "first frame" in the present invention. The light reflective sheet 7, the light guide plate 8, the light source 9, the light diffusion sheet 10, and the prism sheet 11 are arranged between the rear frame 6 and the resin frame 12 in a state held therebetween in a direction Z.

Furthermore, a liquid crystal panel 13 (liquid crystal cell) is arranged above the resin frame 12. The liquid crystal panel 13 is examples of the "display portion" and the "liquid crystal display portion" in the present invention. A frame-shaped bezel 14 is arranged above the liquid crystal panel 13. The bezel 14 is arranged to press the outer edge 13a of the liquid crystal panel 13 downward (in the direction Z2). The liquid crystal panel 13 and the bezel 14 each have a substantially rectangular shape elongated in the direction X as viewed from the bottom surface.

Figure 4:
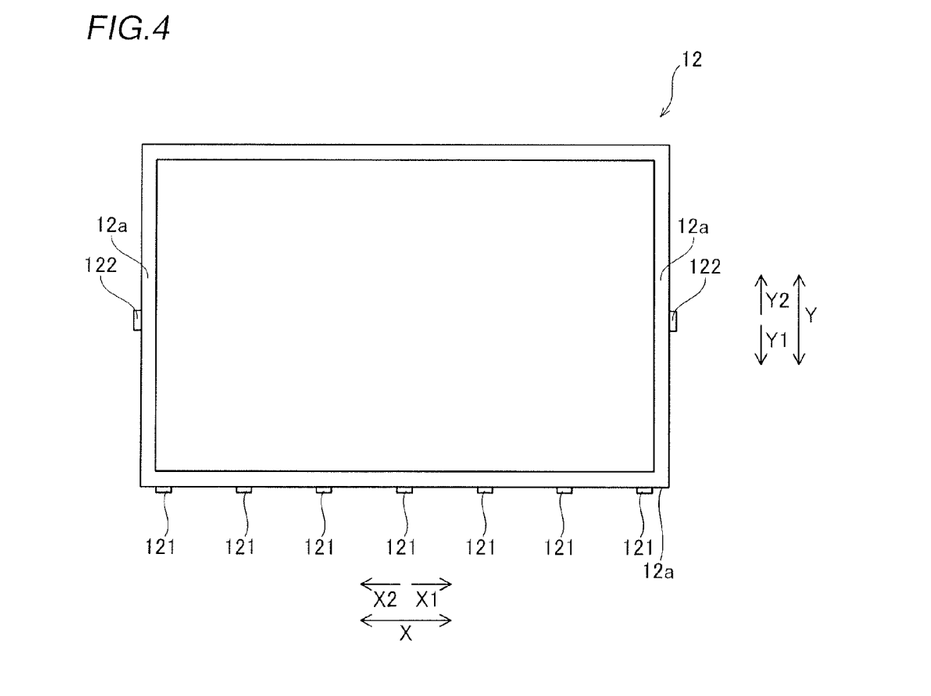
FIG. 4 is a plan view of a resin frame according to the embodiment of the present invention.

As shown in FIG. 4, seven projecting engaging protrusion portions 121 are formed on the outer edge 12a of the resin frame 12 in the direction Y1 to protrude outward (in the direction Y1) from the outer edge 12a of the resin frame 12 as viewed from above. The seven engaging protrusion portions 121 are formed to engage with the seven engaging portions 61 of the rear frame 6 in the direction Y1, respectively.

Figure 6:
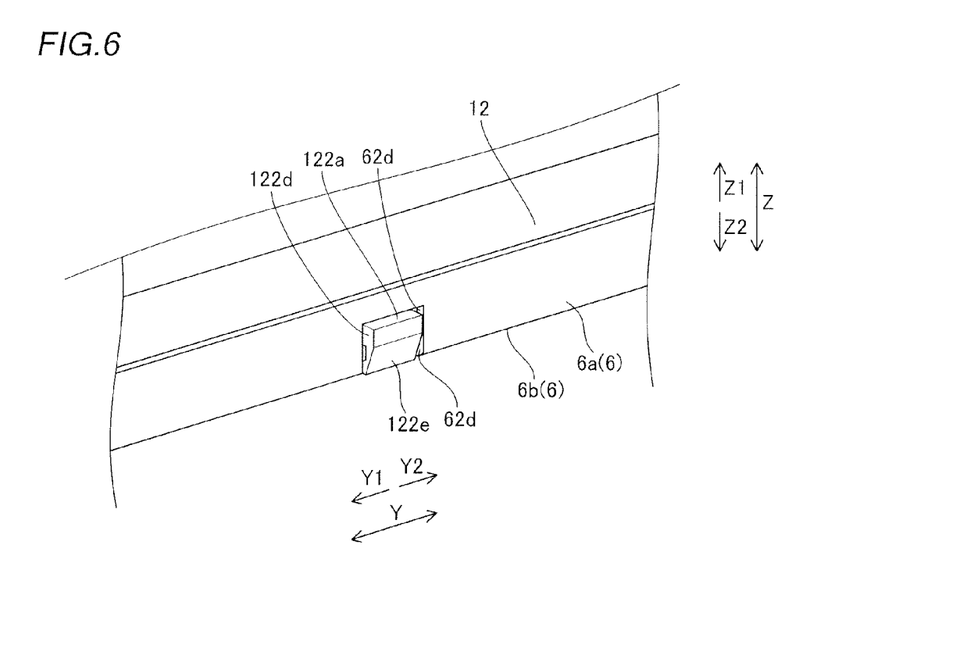
FIG. 6 is a diagram of the engaging protrusion portion of the resin frame and the engaging hole of the rear frame according to the embodiment of the present invention after engagement.

According to this embodiment, a single engaging protrusion portion 122 is formed on each of the outer edge 12a of the resin frame 12 in the direction X1 and the outer edge 12a of the resin frame 12 in the direction X2 to protrude outward from each of the outer edges 12a of the resin frame 12 as viewed from above. As shown in FIG. 5, the engaging protrusion portion 122 is formed to be capable of engaging with the engaging hole 62 of the rear frame 6. As shown in FIG. 6, the resin frame 12 formed with the engaging protrusion portion 122 is arranged to be fitted inside the rear frame 6 formed with the engaging hole 62.

The seven engaging protrusion portions 121 and the two engaging protrusion portions 122 formed on the outer edges 12a of the resin frame 12 engage with the seven engaging portions 61 and the two engaging holes 62 formed in the side surfaces 6a of the rear frame 6 not to separate the resin frame 12 and the rear frame 6 from each other.

Next, the engaging protrusion portion 122 of the resin frame 12 in the direction X1 and the engaging hole 62 of the rear frame 6 in the direction X1 are described in detail with reference to FIGS. 7 to 9.

Figure 7:
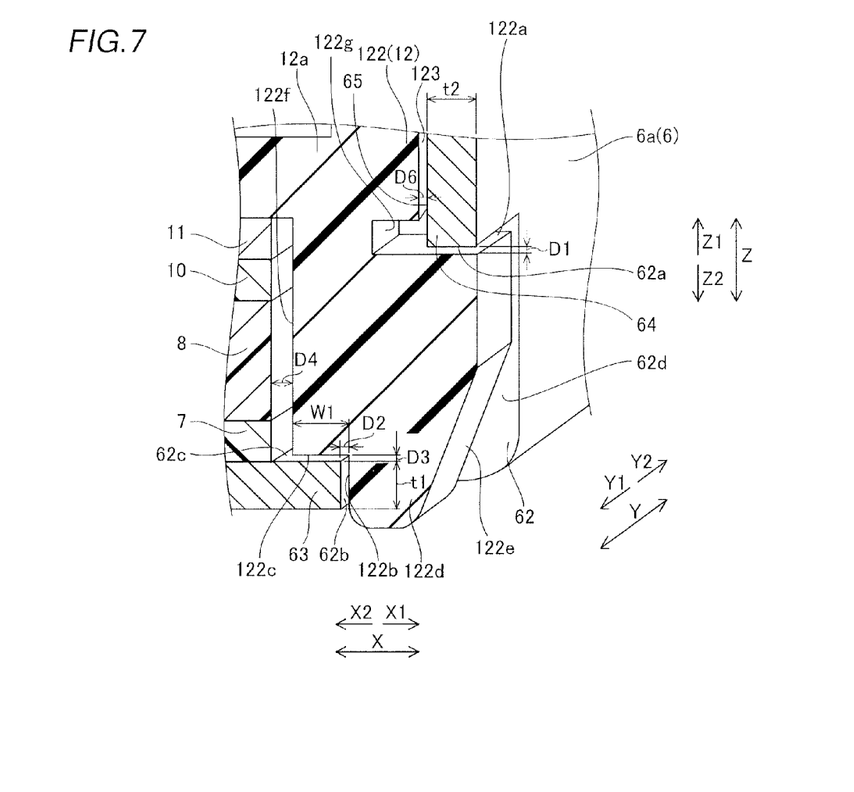
FIG. 7 is a sectional view of the engaging protrusion portion of the resin frame and the engaging hole of the rear frame according to the embodiment of the present invention after engagement.

According to this embodiment, the engaging protrusion portion 122 formed on the outer edge 12a of the resin frame 12 in the direction X1 includes a first engaging portion 122a, a second engaging portion 122b, a third engaging portion 122c, a fourth engaging portion 122d, an inclined portion 122e, an end surface 122f, and a recess portion 122g, as shown in FIG. 7.

The first engaging portion 122a is formed to protrude in the direction X1. Furthermore, the first engaging portion 122a is formed to engage with a first inner surface 62a of the engaging hole 62 so as to regulate movement of the resin frame 12 in the direction Z1 separating from the rear frame 6. The first engaging portion 122a of the engaging protrusion portion 122 of the resin frame 12 and the first inner surface 62a of the engaging hole 62 of the rear frame 6 in the direction Z1 are opposed to each other at an interval D1 in a state where the engaging protrusion portion 122 and the engaging hole 62 engage with each other.

Figure 8:
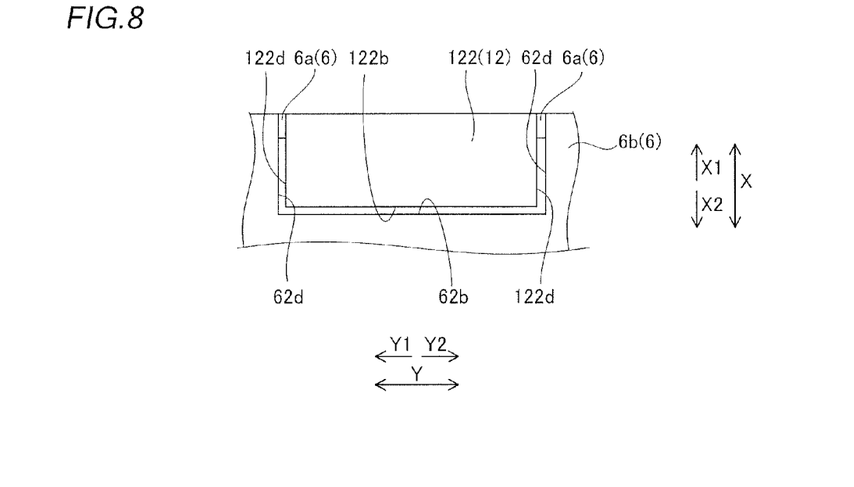
FIG. 8 is a diagram of the engaging protrusion portion of the resin frame and the engaging hole of the rear frame according to the embodiment of the present invention after engagement as viewed from the side of the rear frame.

The second engaging portion 122b is formed to protrude in the direction Z2 (direction in which the resin frame 12 is mounted to the rear frame 6), as shown in FIGS. 7 and 8. Furthermore, the second engaging portion 122b is formed to engage with a second inner surface 62b of the engaging hole 62 so as to regulate movement of the resin frame 12 in the direction X2 with respect to the rear frame 6. The second engaging portion 122b of the engaging protrusion portion 122 of the resin frame 12 and the second inner surface 62b of the engaging hole 62 of the rear frame 6 are opposed to each other at an interval D2 in the state where the engaging protrusion portion 122 and the engaging hole 62 engage with each other.

The third engaging portion 122c is formed to protrude in the direction X2, as shown in FIG. 7. Furthermore, the third engaging portion 122c is formed to engage with an inner bottom surface 62c in the vicinity of the engaging hole 62 so as to regulate movement of the resin frame 12 in the direction Z2 with respect to the rear frame 6. The width W1 of the third engaging portion 122c in the direction X is larger than the thickness t1 of a bottom portion 63 of the rear frame 6 in the vicinity of the second inner surface 62b (W1>t1). Furthermore, the width W1 of the third engaging portion 122c in the direction X is larger than the thickness t2 of a side portion 64 of the rear frame 6 in the vicinity of the first inner surface 62a (W1>t2). The third engaging portion 122c of the engaging protrusion portion 122 of the resin frame 12 and the inner bottom surface 62c in the vicinity of the engaging hole 62 of the rear frame 6 are opposed to each other at an interval D3 in the state where the engaging protrusion portion 122 and the engaging hole 62 engage with each other. The end surface 122f of the engaging protrusion portion 122 of the resin frame 12 in the direction X2 and the end surfaces of the light reflective sheet 7, the light guide plate 8, the light diffusion sheet 10, and the prism sheet 11 in the direction X1 are arranged at an interval D4.

Figure 9:
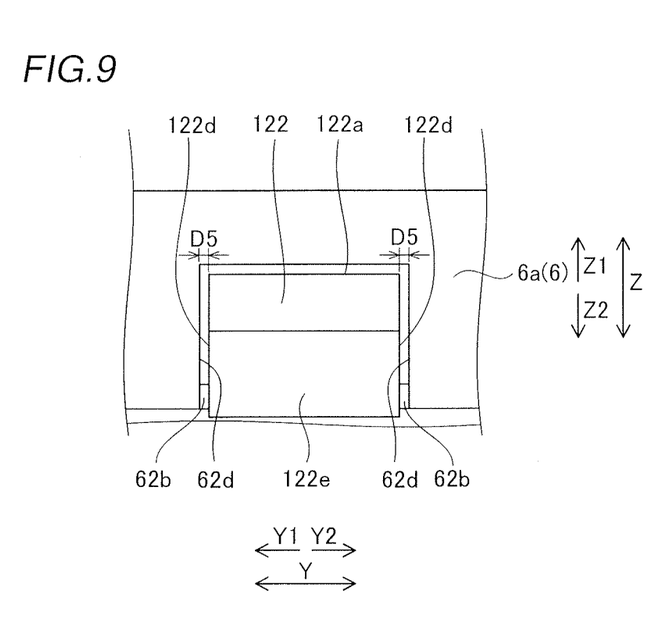
FIG. 9 is a diagram of the engaging protrusion portion of the resin frame and the engaging hole of the rear frame according to the embodiment of the present invention after engagement as viewed from the side surface.

As shown in FIG. 9, the fourth engaging portion 122d is formed to engage with a fourth inner surface 62d of the engaging hole 62 so as to regulate movement of the resin frame 12 in the direction Y with respect to the rear frame 6. The fourth engaging portion 122d of the engaging protrusion portion 122 of the resin frame 12 and the fourth inner surface 62d of the engaging hole 62 of the rear frame 6 are opposed to each other at an interval D5 in the state where the engaging protrusion portion 122 and the engaging hole 62 engage with each other.

As shown in FIG. 7, the inner surface 65 of the rear frame 6 is formed to regulate movement of the outer surface 123 of the resin frame 12 in the direction X1 with respect to the rear frame 6 in the state where the engaging protrusion portion 122 of the resin frame 12 and the engaging hole 62 of the rear frame 6 engage with each other. The outer surface 123 of the resin frame 12 and the inner surface 65 of the rear frame 6 are opposed to each other at an interval D6 in the state where the engaging protrusion portion 122 and the engaging hole 62 engage with each other.

The inclined portion 122e is provided beyond the first engaging portion 122a in the direction Z2 and on the side of the engaging protrusion portion 122 in the direction X1. This inclined portion 122e is formed in a region of the engaging protrusion portion 122 inclined to be tapered toward the direction Z2. The inclined portion 122e is provided to facilitate mounting of the resin frame 12 on the rear frame 6. Specifically, the resin frame 12 is pushed into the rear frame 6 while bringing the inclined portion 122e of the resin frame 12 into contact with the rear frame 6, whereby the resin frame 12 is mounted on the rear frame 6 while sliding the inclined portion 122e to the rear frame 6. The recess portion 122g is formed in a portion of the engaging protrusion portion 122 opposed to the side portion 64 of the rear frame 6. This recess portion 122g is formed to inhibit the engaging protrusion portion 122 from partially shrinking and being concave upon cooling when the resin frame 12 is molded.

As shown in FIG. 5, the first engaging portion 122a, the second engaging portion 122b, the third engaging portion 122c (see FIG. 7), the inclined portion 122e, and the recess portion 122g (see FIG. 7) of the engaging protrusion portion 122 are formed to extend from the fourth engaging portion 122d (see FIG. 8) in the direction Y1 to the fourth engaging portion 122d in the direction Y2 along the direction Y. The first engaging portion 122a, the second engaging portion 122b, and the third engaging portion 122c are formed to engage with the first inner surface 62a, the second inner surface 62b, and the inner bottom surface 62c of the engaging hole 62, respectively, along the direction Y.

An engaging state between the engaging protrusion portion 122 of the resin frame 12 in the direction X2 and the engaging hole 62 of the rear frame 6 in the direction X2 is similar in structure to the aforementioned engaging state between the engaging protrusion portion 122 of the resin frame 12 in the direction X1 and the engaging hole 62 of the rear frame 6 in the direction X1.

According to this embodiment, as hereinabove described, the engaging protrusion portion 122 of the resin frame 12 includes the second engaging portion 122b protruding in the direction Z2 in which the resin frame 12 is mounted to the rear frame 6 and engaging with the engaging hole 62 to regulate the movement of the resin frame 12 in the direction X2 opposite to the direction X1 with respect to the rear frame 6. Thus, the second engaging portion 122b can inhibit the engaging protrusion portion 122 and the engaging hole 62 from disengaging from each other when the resin frame 12 formed with the engaging protrusion portion 122 moves in the direction X2 opposite to the direction X1 in which the engaging protrusion portion 122 protrudes with respect to the rear frame 6 formed with the engaging hole 62. Consequently, the engaging state between the resin frame 12 formed with the engaging protrusion portion 122 and the rear frame 6 formed with the engaging hole 62 in the direction X2 can be maintained. Furthermore, the engaging protrusion portion 122 of the resin frame 12 includes the first engaging portion 122a protruding in the direction X1 outward from the outer edge 12a of the resin frame 12 and engaging with the engaging hole 62 to regulate the movement of the resin frame 12 in the direction Z1 separating from the rear frame 6, whereby the first engaging portion 122a can inhibit the engaging protrusion portion 122 and the engaging hole 62 from disengaging from each other when the resin frame 12 formed with the engaging protrusion portion 122 moves in the direction Z1 separating from the rear frame 6 formed with the engaging hole 62. Consequently, the engaging state between the resin frame 12 formed with the engaging protrusion portion 122 and the rear frame 6 formed with the engaging hole 62 can be maintained. Thus, the two engaging portions, i.e., the second engaging portion 122b and the first engaging portion 122a of the engaging protrusion portion 122 of the resin frame 12 can regulate the movement of the resin frame 12 in the two directions, i.e., the direction X2 and the direction Z1 with respect to the rear frame 6, and hence the engaging state between the resin frame 12 formed with the engaging protrusion portion 122 and the rear frame 6 formed with the engaging hole 62 can be reliably maintained.

According to this embodiment, as hereinabove described, the third engaging portion 122c of the engaging protrusion portion 122 of the resin frame 12 is formed to engage with the inner bottom surface 62c of the rear frame 6 in the vicinity of the engaging hole 62 so as to regulate the movement of the resin frame 12 in the direction Z2, whereby the engaging protrusion portion 122 of the resin frame 12 can be inhibited from disengaging in the direction Z2 from the engaging hole 62 of the rear frame 6. Thus, the engaging state between the resin frame 12 formed with the engaging protrusion portion 122 and the rear frame 6 formed with the engaging hole 62 in the direction Z2 can be maintained. Furthermore, the third engaging portion 122c of the engaging protrusion portion 122 of the resin frame 12 can regulate the movement of the resin frame 12 in the three directions including not only the direction X2 and the direction Z1 but also the direction Z2 with respect to the rear frame 6, and hence the engaging state between the resin frame 12 and the rear frame 6 can be more reliably maintained.

According to this embodiment, as hereinabove described, the width W1 of the third engaging portion 122c in the direction X2 is rendered larger than the thickness t1 of the bottom portion 63 of the rear frame 6 in the vicinity of the engaging hole 62, whereby the movement of the resin frame 12 in the direction Z2 with respect to the rear frame 6 can be more reliably regulated as compared with a case where the width W1 of the third engaging portion 122c in the direction X2 is smaller than the thickness of the bottom portion 63 of the rear frame 6 in the vicinity of the engaging hole 62.

According to this embodiment, as hereinabove described, the second engaging portion 122b of the engaging protrusion portion 122 of the resin frame 12 and the second inner surface 62b of the engaging hole 62 of the rear frame 6 in the direction X2 are opposed to each other at the prescribed interval. Thus, the second engaging portion 122b of the engaging protrusion portion 122 of the resin frame 12 and the second inner surface 62b of the engaging hole 62 of the rear frame 6 in the direction X2 are arranged at the prescribed interval so that the resin frame 12 and the rear frame 6 can be inhibited from contact with each other and deformation due to thermal stress when the resin frame 12 or the rear frame 6 thermally expands by heat or the like generated by using the liquid crystal television set 100, for example.

According to this embodiment, as hereinabove described, the engaging hole 62 of the rear frame 6 is formed over the two surfaces, i.e., the side surface 6a and the bottom surface 6b of the rear frame 6. Thus, a portion of the engaging hole 62 in the side surface 6a can regulate the movement of the resin frame 12 in the direction Z1 while a portion of the engaging hole 62 in the bottom surface 6b can regulate the movement of the resin frame 12 in the direction X2 dissimilarly to a case where the engaging hole 62 of the rear frame 6 is formed in either the side surface 6a or the bottom surface 6b of the rear frame 6. Consequently, the movement of the resin frame 12 in the two directions with respect to the rear frame 6 can be easily regulated.

According to this embodiment, as hereinabove described, the second engaging portion 122b of the engaging protrusion portion 122 of the resin frame 12 is formed to engage with the second inner surface 62b of the engaging hole 62 formed in the bottom surface 6b (bottom portion 63) of the rear frame 6 in the direction X2 so as to regulate the movement of the resin frame 12 in the direction X2 with respect to the rear frame 6. Thus, the engaging protrusion portion 122 of the resin frame 12 can be inhibited from disengaging in the direction X2 from the engaging hole 62 of the rear frame 6, and hence the engaging state between the resin frame 12 formed with the engaging protrusion portion 122 and the rear frame 6 formed with the engaging hole 62 in the direction X2 can be maintained.

According to this embodiment, as hereinabove described, the first engaging portion 122a of the engaging protrusion portion 122 of the resin frame 12 is formed to engage with the first inner surface 62a of the engaging hole 62 so as to regulate the movement of the resin frame 12 in the direction Z1 separating from the rear frame 6. Thus, the engaging protrusion portion 122 of the resin frame 12 can be inhibited from disengaging in the direction Z1 from the engaging hole 62 of the rear frame 6, and hence the engaging state between the resin frame 12 formed with the engaging protrusion portion 122 and the rear frame 6 formed with the engaging hole 62 in the direction Z1 can be maintained.

According to this embodiment, as hereinabove described, the engaging protrusion portion 122 of the resin frame 12 further includes the fourth engaging portion 122d engaging with the fourth inner surface 62d of the engaging hole 62 to regulate the movement of the resin frame 12 in the direction Y substantially orthogonal to the direction X1, the direction Z1, the direction Z2, and the direction X2 with respect to the rear frame 6. Thus, the engaging protrusion portion 122 of the resin frame 12 can be inhibited from disengaging in the direction Y from the engaging hole 62 of the rear frame 6, and hence the engaging state between the resin frame 12 formed with the engaging protrusion portion 122 and the rear frame 6 formed with the engaging hole 62 in the direction Y can be maintained.

According to this embodiment, as hereinabove described, the first engaging portion 122a, the second engaging portion 122b, and the third engaging portion 122c of the engaging protrusion portion 122 are formed to engage with the first inner surface 62a, the second inner surface 62b, and the inner bottom surface 62c of the engaging hole 62, respectively, along the direction Y. Thus, the first engaging portion 122a engaging with the first inner surface 62a along the direction Y can inhibit the engaging protrusion portion 122 from disengaging in the direction Z1 from the engaging hole 62, the second engaging portion 122b engaging with the second inner surface 62b along the direction Y can inhibit the engaging protrusion portion 122 from disengaging in the direction X2 from the engaging hole 62, and the third engaging portion 122c engaging with the inner bottom surface 62c along the direction Y can inhibit the engaging protrusion portion 122 from disengaging in the direction Z2 from the engaging hole 62. Consequently, the engaging state between the resin frame 12 and the rear frame 6 can be more reliably maintained.

According to this embodiment, as hereinabove described, the inner surface 65 of the rear frame 6 is formed to regulate the movement of the outer surface 123 of the resin frame 12 in the direction X1 with respect to the rear frame 6 in the state where the engaging protrusion portion 122 of the resin frame 12 and the engaging hole 62 of the rear frame 6 engage with each other. Thus, the inner surface 65 of the rear frame 6 can inhibit the resin frame 12 from disengaging in the direction X1 from the rear frame 6, and hence the engaging state between the resin frame 12 and the rear frame 6 in the direction X1 can be maintained.

According to this embodiment, as hereinabove described, the inclined portion 122e of the engaging protrusion portion 122 of the resin frame 12 is formed in the region of the engaging protrusion portion 122 inclined to be tapered toward the direction Z2. Thus, the engaging protrusion portion 122 can be easily inserted into the engaging hole 62 when the resin frame 12 is mounted to the rear frame 6 in the direction Z2, and hence the engaging protrusion portion 122 can easily engage with the engaging hole 62.

According to this embodiment, as hereinabove described, the single engaging protrusion portion 122 is formed on each of the outer edge 12a of the resin frame 12 having the substantially rectangular shape in the direction X1 and the outer edge 12a of the resin frame 12 having the substantially rectangular shape in the direction X2 while the single engaging hole 62 is formed in each of the side surface 6a of the rear frame 6 having the substantially rectangular shape in the direction X1 and the side surface 6a of the rear frame 6 having the substantially rectangular shape in the direction X2. Thus, the engaging protrusion portion 122 and the engaging hole 62 can engage with each other on each of the two sides opposed to each other, and hence the engaging state between the resin frame 12 and the rear frame 6 can be reliably maintained.

According to this embodiment, as hereinabove described, the liquid crystal television set 100 includes the liquid crystal panel 13, and the light guide plate 8 and the light reflective sheet 7 are arranged between the resin frame 12 and the rear frame 6. Thus, the light guide plate 8 and the light reflective sheet 7 are arranged between the resin frame 12 and the rear frame 6 in a state where the engaging state between the resin frame 12 and the rear frame 6 is reliably maintained, and hence the liquid crystal television set 100 in which the light guide plate 8 and the light reflective sheet 7 properly overlaps the liquid crystal panel 13 can be obtained.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to the liquid crystal television set 100 as the example of the display device in the aforementioned embodiment, the present invention is not restricted to this. The present invention is also applicable to a display device other than the liquid crystal television set, for example.

While the liquid crystal module is employed as the example of the display module according to the present invention in the aforementioned embodiment, the present invention is not restricted to this. The present invention is also applicable to a display module other than the liquid crystal module, for example.

While the resin frame is formed with the engaging protrusion portion while the rear frame is formed with the engaging hole in the aforementioned embodiment, the present invention is not restricted to this. The resin frame may alternatively be formed with the engaging hole while the rear frame may alternatively be formed with the engaging protrusion portion, for example.

While the first frame in the present invention is the resin frame while the second frame in the present invention is the rear frame made of sheet metal in the aforementioned embodiment, the present invention is not restricted to this. The first frame may alternatively be made of sheet metal while the second frame may alternatively be made of resin, for example. Alternatively, both the first and second frames may be made of resin or made of sheet metal.

While the first to fourth engaging portions of the engaging protrusion portion and the inner surfaces of the engaging hole are opposed to each other at the respective prescribed intervals in the aforementioned embodiment, the present invention is not restricted to this. There may alternatively be no clearance (prescribed interval) between the first to fourth engaging portions of the engaging protrusion portion and the inner surfaces of the engaging hole, for example.

What is claimed is:

1. A display device comprising:
a display portion;
a first frame including an engaging protrusion portion protruding in a first direction outward from an outer edge of said first frame, arranged to overlap with said display portion; and
a second frame including an engaging hole engaging with said engaging protrusion portion of said first frame, wherein
said engaging protrusion portion of said first frame includes:
a first engaging portion protruding in said first direction outward from said outer edge of said first frame and engaging with said engaging hole to prevent a movement of said first frame in a second direction separating from said second frame, and
a second engaging portion protruding in a third direction in which said first frame is mounted to said second frame and engaging with said engaging hole to prevent a movement of said engaging protrusion portion of said first frame in a fourth direction inward from said outer edge of said first frame opposite to said first direction with respect to said second frame,
said second direction is a direction orthogonal to said first direction and opposite to said third direction,
said engaging hole has a first inner surface opposed to said first engaging portion and a second inner surface opposed to said second engaging portion at a prescribed interval along said fourth direction, and
said prescribed interval is smaller than a distance between an end of said first engaging portion in the first direction and an end of said first inner surface in the fourth direction.

2. The display device according to claim 1, wherein
said engaging protrusion portion further includes a third engaging portion protruding in said fourth direction opposite to said first direction and engaging with said engaging hole to prevent a movement of said first frame in said third direction with respect to said second frame.

3. The display device according to claim 2, wherein
a width of said third engaging portion in said fourth direction is larger than a thickness of a bottom portion of said second frame in a vicinity of said engaging hole.

4. The display device according to claim 2, wherein
said third engaging portion is formed to engage with an inner bottom surface of said second frame in a vicinity of said engaging hole so as to prevent the movement of said first frame in said third direction.

5. The display device according to claim 1, wherein
said engaging hole is formed over a side surface and a bottom surface of said second frame.

6. The display device according to claim 5, wherein
said second engaging portion is formed to engage with said second inner surface formed in said bottom surface of said second frame so as to prevent the movement of said first frame in said fourth direction with respect to said second frame.

7. The display device according to claim 5, wherein
said first engaging portion is formed to engage with said first inner surface formed in said side surface of said second frame so as to prevent the movement of said first frame in said second direction with respect to said second frame.

8. The display device according to claim 1, wherein
said engaging protrusion portion further includes a fourth engaging portion engaging with said engaging hole to prevent a movement of said first frame in a fifth direction substantially orthogonal to said first direction, said second direction, said third direction, and said fourth direction with respect to said second frame.

9. The display device according to claim 8, wherein
said engaging hole is formed over a side surface and a bottom surface of said second frame, and
said fourth engaging portion is formed to engage with an inner surface of said engaging hole of said second frame in said fifth direction so as to prevent the movement of said first frame in said fifth direction with respect to said second frame.

10. The display device according to claim 8, wherein
both of said first engaging portion and said second engaging portion of said engaging protrusion portion engage with said engaging hole along said fifth direction.

11. The display device according to claim 1, wherein
an inner surface of said second frame is formed to prevent a movement of an outer surface of said first frame in said first direction with respect to said second frame in a state where said engaging protrusion portion and said engaging hole engage with each other.

12. The display device according to claim 1, wherein
said engaging protrusion portion further includes an inclined portion inclined to be tapered toward said third direction in which said first frame is mounted to said second frame.

13. The display device according to claim 1, wherein
each of said first frame and said second frame is formed in a substantially rectangular shape in plain view, and
said engaging protrusion portion is provided on each of two sides opposed to each other in outer edges of said first frame while said engaging hole is provided in each of two sides opposed to each other in side surfaces of said second frame.

14. The display device according to claim 1, wherein
said display portion comprises a liquid crystal display portion, and
a light guide plate and a light reflective sheet are arranged between said first frame and said second frame.

* * * * *